United States Patent
Kurtoglu et al.

(10) Patent No.: US 11,295,152 B2
(45) Date of Patent: Apr. 5, 2022

(54) METHOD AND SYSTEM FOR OBJECT RECOGNITION VIA A COMPUTER VISION APPLICATION

(71) Applicant: BASF Coatings GmbH, Münster (DE)

(72) Inventors: Yunus Emre Kurtoglu, Southfield, MI (US); Matthew Ian Childers, Southfield, MI (US)

(73) Assignee: BASF Coatings GmbH, Muenster (DE)

( * ) Notice: Subject to any disclaimer, the term of this patent is extended or adjusted under 35 U.S.C. 154(b) by 179 days.

(21) Appl. No.: 16/289,706

(22) Filed: Mar. 1, 2019

(65) Prior Publication Data
US 2020/0279383 A1    Sep. 3, 2020

(51) Int. Cl.
G06K 9/20       (2006.01)
G06T 7/521      (2017.01)

(52) U.S. Cl.
CPC ......... *G06K 9/2027* (2013.01); *G06K 9/209* (2013.01); *G06T 7/521* (2017.01); *G06T 2207/10152* (2013.01)

(58) Field of Classification Search
None
See application file for complete search history.

(56) References Cited

U.S. PATENT DOCUMENTS

| | | | | |
|---|---|---|---|---|
| 4,671,662 A * | 6/1987 | Zupanick | ............. | G01N 21/645 250/458.1 |
| 6,567,116 B1 * | 5/2003 | Aman | ................... | G06K 9/3216 348/169 |
| 8,998,468 B2 * | 4/2015 | Jaffe | .................... | A61B 1/0638 362/552 |
| 10,140,494 B1 * | 11/2018 | Lawandy | ............... | G07D 7/205 |

(Continued)

FOREIGN PATENT DOCUMENTS

WO    WO-2013098708 A2 *  7/2013   ........... H04N 5/3532

OTHER PUBLICATIONS

Wikipedia contributors. (Dec. 19, 2020). Available light. In Wikipedia, The Free Encyclopedia. Retrieved 17:42, Feb. 1, 2021, from https://en.wikipedia.org/w/index.php?title=Available_light&oldid=995155651 (Year: 2021).*

*Primary Examiner* — Tahmina N Ansari
(74) *Attorney, Agent, or Firm* — Armstrong Teasdale LLP

(57) ABSTRACT

A method and system for object recognition via a computer vision application including an object to be recognized, the object having an object specific luminescence spectral pattern, a light source including at least two illuminants for illuminating a scene including the object to be recognized by switching between the two illuminants, a sensor configured to capture radiance data of the scene including the object when the scene is illuminated by the light source, and a data storage unit storing fluorescence spectral patterns together with appropriately assigned respective objects. The method and system further include a data processing unit configured to extract the object specific fluorescence spectral pattern from the radiance data of the scene and to match the extracted object specific fluorescence spectral pattern with the fluorescence spectral patterns stored in the data storage unit, and to identify a best matching fluorescence spectral pattern and its assigned object.

19 Claims, 8 Drawing Sheets

(56) References Cited

U.S. PATENT DOCUMENTS

| | | | |
|---|---|---|---|
| 2006/0186348 A1* | 8/2006 | Nguyen | G07D 7/1205 250/484.4 |
| 2008/0048106 A1* | 2/2008 | Blanchard | G07D 7/121 250/252.1 |
| 2012/0119110 A1* | 5/2012 | Hirsch | G01N 21/6486 250/459.1 |
| 2016/0162907 A1* | 6/2016 | Liu | G06K 7/1408 235/462.41 |
| 2016/0300107 A1* | 10/2016 | Callegari | G06T 7/38 |
| 2019/0234799 A1* | 8/2019 | Dorier | G07D 7/205 |
| 2020/0279383 A1* | 9/2020 | Kurtoglu | G06K 9/209 |

* cited by examiner

| Spectral angle (lower is better) | | | | | | |
|---|---|---|---|---|---|---|
| | | Material | | | | |
| | | A | B | C | D | E |
| Comparison Materials | A | 0.150 | 0.259 | 0.921 | 1.320 | 0.217 |
| | B | 0.362 | 0.232 | 0.808 | 1.335 | 0.236 |
| | C | 0.955 | 1.014 | 0.271 | 0.688 | 0.995 |
| | D | 1.136 | 1.239 | 0.563 | 0.222 | 1.215 |
| | E | 0.277 | 0.199 | 0.847 | 1.339 | 0.173 |

Fig. 5 B

| Euclidean distance (lower is better) | | | | | | |
|---|---|---|---|---|---|---|
| | | Material | | | | |
| | | A | B | C | D | E |
| Comparison Materials | A | 0.913 | 1.077 | 4.162 | 5.632 | 0.950 |
| | B | 1.886 | 1.062 | 3.650 | 5.434 | 1.203 |
| | C | 4.139 | 4.052 | 1.521 | 3.179 | 4.081 |
| | D | 4.925 | 4.966 | 2.694 | 1.203 | 4.990 |
| | E | 1.463 | 0.845 | 3.826 | 5.591 | 0.845 |

Fig. 5 C

| Mean absolute error (lower is better) | | | | | | |
|---|---|---|---|---|---|---|
| | | Calculated Material | | | | |
| | | A | B | C | D | E |
| Comparison Materials | A | 0.061 | 0.078 | 0.251 | 0.310 | 0.058 |
| | B | 0.120 | 0.023 | 0.233 | 0.293 | 0.056 |
| | C | 0.266 | 0.273 | 0.058 | 0.107 | 0.273 |
| | D | 0.329 | 0.317 | 0.170 | 0.035 | 0.327 |
| | E | 0.094 | 0.046 | 0.251 | 0.312 | 0.038 |

Fig. 9 A

| Spectral angle mapping (lower is better) | | | | | | |
|---|---|---|---|---|---|---|
| | | Calculated Material | | | | |
| | | A | B | C | D | E |
| Comparison Materials | A | 0.180 | 0.323 | 0.998 | 1.226 | 0.217 |
| | B | 0.363 | 0.101 | 0.987 | 1.257 | 0.182 |
| | C | 0.932 | 1.090 | 0.174 | 0.401 | 0.988 |
| | D | 1.106 | 1.241 | 0.612 | 0.150 | 1.169 |
| | E | 0.275 | 0.155 | 0.998 | 1.257 | 0.137 |

Fig. 9 B

| Euclidean distance (lower is better) | | | | | | |
|---|---|---|---|---|---|---|
| | | Calculated Material | | | | |
| | | A | B | C | D | E |
| Comparison Materials | A | 0.374 | 0.589 | 1.668 | 1.884 | 0.374 |
| | B | 0.745 | 0.155 | 1.551 | 1.772 | 0.357 |
| | C | 1.626 | 1.626 | 0.307 | 0.654 | 1.599 |
| | D | 1.876 | 1.788 | 1.026 | 0.257 | 1.835 |
| | E | 0.548 | 0.366 | 1.640 | 1.883 | 0.232 |

Fig. 9 C

METHOD AND SYSTEM FOR OBJECT RECOGNITION VIA A COMPUTER VISION APPLICATION

The present invention refers to a method and a system for object recognition via a computer vision application.

Computer vision is a field in rapid development due to abundant use of electronic devices capable of collecting information about their surroundings via sensors such as cameras, distance sensors such as LIDAR or radar, and depth camera systems based on structured light or stereo vision to name a few. These electronic devices provide raw image data to be processed by a computer processing unit and consequently develop an understanding of an environment or a scene using artificial intelligence and/or computer assistance algorithms. There are multiple ways how this understanding of the environment can be developed. In general, 2D or 3D images and/or maps are formed, and these images and/or maps are analyzed for developing an understanding of the scene and the objects in that scene. One prospect for improving computer vision is to measure the components of the chemical makeup of objects in the scene. While shape and appearance of objects in the environment acquired as 2D or 3D images can be used to develop an understanding of the environment, these techniques have some shortcomings.

One challenge in computer vision field is being able to identify as many objects as possible within each scene with high accuracy and low latency using a minimum amount of resources in sensors, computing capacity, light probe etc. The object identification process has been termed remote sensing, object identification, classification, authentication or recognition over the years. In the scope of the present disclosure, the capability of a computer vision system to identify an object in a scene is termed as "object recognition". For example, a computer analyzing a picture and identifying/labelling a ball in that picture, sometimes with even further information such as the type of a ball (basketball, soccer ball, baseball), brand, the context, etc. fall under the term "object recognition".

Generally, techniques utilized for recognition of an object in computer vision systems can be classified as follows:

Technique 1: Physical tags (image based): Barcodes, QR codes, serial numbers, text, patterns, holograms etc.

Technique 2: Physical tags (scan/close contact based): Viewing angle dependent pigments, upconversion pigments, metachromics, colors (red/green), luminescent materials.

Technique 3: Electronic tags (passive): RFID tags, etc. Devices attached to objects of interest without power, not necessarily visible but can operate at other frequencies (radio for example).

Technique 4: Electronic tags (active): wireless communications, light, radio, vehicle to vehicle, vehicle to anything (X), etc. Powered devices on objects of interest that emit information in various forms.

Technique 5: Feature detection (image based): Image analysis and identification, i.e. two wheels at certain distance for a car from side view; two eyes, a nose and mouth (in that order) for face recognition etc. This relies on known geometries/shapes.

Technique 6: Deep learning/CNN based (image based): Training of a computer with many of pictures of labeled images of cars, faces etc. and the computer determining the features to detect and predicting if the objects of interest are present in new areas. Repeating of the training procedure for each class of object to be identified is required.

Technique 7: Object tracking methods: Organizing items in a scene in a particular order and labeling the ordered objects at the beginning. Thereafter following the object in the scene with known color/geometry/3D coordinates. If the object leaves the scene and re-enters, the "recognition" is lost.

In the following, some shortcomings of the above-mentioned techniques are presented.

Technique 1: When an object in the image is occluded or only a small portion of the object is in the view, the barcodes, logos etc. may not be readable. Furthermore, the barcodes etc. on flexible items may be distorted, limiting visibility. All sides of an object would have to carry large barcodes to be visible from a distance otherwise the object can only be recognized in close range and with the right orientation only. This could be a problem for example when a barcode on an object on the shelf at a store is to be scanned. When operating over a whole scene, technique 1 relies on ambient lighting that may vary.

Technique 2: Upconversion pigments have limitations in viewing distances because of the low level of emitted light due to their small quantum yields. They require strong light probes. They are usually opaque and large particles limiting options for coatings. Further complicating their use is the fact that compared to fluorescence and light reflection, the upconversion response is slower. While some applications take advantage of this unique response time depending on the compound used, this is only possible when the time of flight distance for that sensor/object system is known in advance. This is rarely the case in computer vision applications. For these reasons, anti-counterfeiting sensors have covered/dark sections for reading, class 1 or 2 lasers as probes and a fixed and limited distance to the object of interest for accuracy.

Similarly viewing angle dependent pigment systems only work in close range and require viewing at multiple angles. Also, the color is not uniform for visually pleasant effects. The spectrum of incident light must be managed to get correct measurements. Within a single image/scene, an object that has angle dependent color coating will have multiple colors visible to the camera along the sample dimensions.

Color-based recognitions are difficult because the measured color depends partly on the ambient lighting conditions. Therefore, there is a need for reference samples and/or controlled lighting conditions for each scene. Different sensors will also have different capabilities to distinguish different colors, and will differ from one sensor type/maker to another, necessitating calibration files for each sensor.

Luminescence based recognition under ambient lighting is a challenging task, as the reflective and luminescent components of the object are added together. Typically luminescence based recognition will instead utilize a dark measurement condition and a priori knowledge of the excitation region of the luminescent material so the correct light probe/source can be used.

Technique 3: Electronic tags such as RFID tags require the attachment of a circuit, power collector, and antenna to the item/object of interest, adding cost and complication to the design. RFID tags provide present or not type information but not precise location information unless many sensors over the scene are used.

Technique 4: These active methods require the object of interest to be connected to a power source, which is cost-prohibitive for simple items like a soccer ball, a shirt, or a box of pasta and are therefore not practical.

Technique 5: The prediction accuracy depends largely on the quality of the image and the position of the camera within the scene, as occlusions, different viewing angles, and the like can easily change the results. Logo type images can be present in multiple places within the scene (i.e., a logo can be on a ball, a T-shirt, a hat, or a coffee mug) and the object recognition is by inference. The visual parameters of the object must be converted to mathematical parameters at great effort. Flexible objects that can change their shape are problematic as each possible shape must be included in the database. There is always inherent ambiguity as similarly shaped objects may be misidentified as the object of interest.

Technique 6: The quality of the training data set determines the success of the method. For each object to be recognized/classified many training images are needed. The same occlusion and flexible object shape limitations as for Technique 5 apply. There is a need to train each class of material with thousands or more of images.

Technique 7: This technique works when the scene is pre-organized, but this is rarely practical. If the object of interest leaves the scene or is completely occluded the object could not be recognized unless combined with other techniques above.

Apart from the above-mentioned shortcomings of the already existing techniques, there are some other challenges worth mentioning. The ability to see a long distance, the ability to see small objects or the ability to see objects with enough detail all require high resolution imaging systems, i.e. high-resolution camera, lidar, radar etc. The high-resolution needs increase the associated sensor costs and increase the amount of data to be processed.

For applications that require instant responses like autonomous driving or security, the latency is another important aspect. The amount of data that needs to be processed determines if edge or cloud computing is appropriate for the application, the latter being only possible if data loads are small. When edge computing is used with heavy processing, the devices operating the systems get bulkier and limit ease of use and therefore implementation.

Since ambient lighting conditions as well as active light probes/sources are important parts of the data collected in image analysis for object recognition, it was an object of the present invention to provide a possibility to combine the need for specialized light probes associated with an imaging sensor device with the need for visually pleasant ambient lighting into a single lighting device. Furthermore, this design lowers the sensitivity of the computer vision application to ambient lighting in general, as now the specialized light probe intensity is directly related to ambient lighting intensity and, in some cases, enable chemistry-/physics-based recognition techniques.

Thus, a need exists for systems and methods that are suitable for simplifying requirements for object recognition via a computer vision application.

SUMMARY OF THE INVENTION

The above-mentioned objects are solved by the system and the method with the features of the respective independent claims. Further embodiments are presented by the following description and the respective dependent claims.

In the first aspect, embodiments of the invention provide a system for object recognition via a computer vision application. The proposed system comprises at least the following components:
  an object to be recognized, the object having object-specific reflectance and luminescence spectral patterns,
  a light source which is composed of at least two illuminants and configured to give a specific spectral response on demand and to illuminate a scene including the object to be recognized by switching between the at least two illuminants, wherein at least one of the at least two illuminants is based on at least one solid-state system,
  a sensor which is configured to measure radiance data of the scene including the object when the scene is illuminated by the light source,
  a data storage unit which stores and provides luminescence spectral patterns together with appropriately assigned respective objects,
  a data processing unit which is configured to extract/estimate the object-specific luminescence spectral pattern of the object to be recognized out of the radiance data of the scene and to compare/match the estimated/extracted object-specific luminescence spectral pattern with the luminescence spectral patterns stored in the data storage unit, and to identify a best matching luminescence spectral pattern and, thus, the object assigned to the identified best matching luminescence spectral pattern.

The at least one solid-state system may be chosen from the group of solid-state systems comprising semiconductor light-emitting diodes (LEDs), organic light-emitting diodes (OLEDs), or polymer light-emitting diodes (PLEDs).

In some embodiments, it may be advantageous to switch between the illuminants of the light source at a rate faster than the human eye can detect. It may be preferred to use fast switching LEDs with broad emission bands, or still more ideally, narrow bands.

By designing unique luminescence spectral patterns and forming a database of luminescence spectral patterns of objects/articles, it is possible to recognize an object displaying one of that luminescence spectral patterns using the proposed system. The proposed system allows to identify discrete luminescence spectral patterns in spectral dimension of an image which is taken by the sensor. It is to be stated that the number of spectral characters is independent of the shape of the object to be recognized. This enables the proposed system to not be limited in number of classifications to geometry/shape of objects. Objects with the same shape and even the same color can be distinguished by analyzing the chemical (luminescence) information extracted by the data processing unit.

According to a possible embodiment of the system, the system further comprises a display unit which is configured to display at least the identified object which is assigned to the identified best matching luminescence spectral pattern.

According to a further embodiment, the object to be recognized, is imparted, e. g. coated, with predefined surface luminescent materials (particularly luminescent dyes) whose luminescent chemistry, i.e. luminescence spectral pattern, is known and used as a tag. By using luminescent chemistry of the object as a tag, object recognition is possible irrespective of the shape of the object or partial occlusions.

Luminescence is the property of light being emitted from a material without heat. A variety of luminescence mechanisms, such as chemiluminescence, mechanoluminescence, and electroluminescence are known. Photoluminescence is the emission of light/photons due to the absorption of other photons. Photoluminescence includes fluorescence, phosphorescence, upconversion, and Raman scattering. Photoluminescence, fluorescence and phosphorescence are able to change the color appearance of an object under ordinary light conditions. While there is a difference between the chemical mechanisms and time scales of fluorescence and phosphorescence, for most computer vision systems they will appear identical. Within the scope of the present disclosure the terms "fluorescence" and "fluorescent" are mostly used (exemplarily and as placeholder), however, a variety of luminescent mechanisms are applicable to the invention.

The object can be imparted, i. e. provided with fluorescent materials in a variety of methods. Fluorescent materials may be dispersed in a coating that may be applied through methods such as spray coating, dip coating, coil coating, roll-to-roll coating, and others. The fluorescent material may be printed onto the object. The fluorescent material may be dispersed into the object and extruded, molded, or cast. Some materials and objects are naturally fluorescent and may be recognized with the proposed system and/or method. Some biological materials (vegetables, fruits, bacteria, tissue, proteins, etc.) may be genetically engineered to be fluorescent. Some objects may be made fluroescent by the addition of fluorescent proteins in any of the ways mentioned herein.

A vast array of fluorescent materials is commercially available. Theoretically, any fluorescent material should be suitable for the computer vision application, as the fluorescent spectral pattern of the object to be identified is measured after production. The main limitations are durability of the fluorescent materials and compatibility with the host material (of the object to be recognized). One example of suitable fluorescent materials are the BASF Lumogen® F series of dyes, such as, for example, yellow 170, orange 240, pink 285, red 305, a combination of yellow 170 and orange 240 or any other combination thereof. Another example of suitable fluorescent materials are Clariant Hostasol® fluorescent dyes Red GG, Red 5B, and Yellow 3G. Optical brighteners are a class of fluorescent materials that are often included in object formulations to reduce the yellow color of many organic polymers. They function by fluorescing invisible ultraviolet light into visible blue light, thus making the produced object appear whiter. Many optical brighteners are commercially available, including BASF Tinopal® SFP and Tinopal® NFW and Clariant Telalux® KSI and Telalux® OB1.

According to still a further embodiment of the proposed system, the data processing unit is configured to identify the best matching fluorescence spectral pattern by using any number of matching algorithms between the extracted/estimated object-specific fluorescence spectral pattern and the stored fluorescence spectral patterns, the matching algorithms being chosen from the group comprising but not limited to: lowest root mean squared error, lowest mean absolute error, highest coefficient of determination, matching of maximum wavelength value.

The processing unit is further configured to estimate/calculate, using the measured radiance data under the at least two illuminants, the fluorescence spectral pattern of the object and, afterwards, to match the estimated/calculated fluorescence spectral pattern to the known database of a plurality of fluorescence spectral patterns. According to an embodiment of the claimed system, the processing unit is configured to estimate, using the measured radiance data under the at least two illuminants, the luminescence spectral pattern and the reflective spectral pattern of the object in a multistep optimization process.

The sensor is generally an optical sensor with photon counting capabilities. More specifically, it may a monochrome camera, or an RGB camera, or a multispectral camera, or a hyperspectral camera. The sensor may be a combination of any of the above, or the combination of any of the above with a tuneable or selectable filter set, such as, for example, a monochrome sensor with specific filters. The sensor may measure a single pixel of the scene, or measure many pixels at once. The optical sensor may be configured to count photons in a specific range of spectrum, particularly in more than three bands. It may be a camera with multiple pixels for a large field of view, particularly simultaneously reading all bands or different bands at different times.

A multispectral camera captures image data within specific wavelength ranges across the electromagnetic spectrum. The wavelengths may be separated by filters or by the use of instruments that are sensitive to particular wavelengths, including light from frequencies beyond the visible light range, i.e. infrared and ultra-violet. Spectral imaging can allow extraction of additional information the human eye fails to capture with its receptors for red, green and blue. A multispectral camera measures light in a small number (typically 3 to 15) of spectral bands. A hyperspectral camera is a special case of spectral camera where often hundreds of contiguous spectral bands are available.

The light source is preferably chosen as being capable of switching between at least two different illuminants. Three or more illuminants may be required for some methods. The total combination of illuminants is refered to as the light source. One method of doing this is to create illuminants from different wavelength light emitting diodes (LEDs). LEDs may be rapidly switched on and off, allowing for fast switching between illuminants. Fluorescent light sources with different emissions may also be used. Incandescent light sources with different filters may also be used. The light source may be switched between illuminants at a rate that is not visible to the human eye. Sinusoidal like illuminants may also be created with LEDs or other light sources, which is useful for some of the proposed computer vision algorithms.

The sensor which is configured to measure the radiance data of the scene is linked and synchronized with the switching of the light source between illuminants. It may be configured to only capture information during the time period one illuminant is active. It may be configured to capture/measure information during one or more illuminants being active and use various algorithms to calculate and issue the radiance for a subset of the illuminants. It may be configured to capture the scene radiance at a particular period before, after or during the activation of the light source and may last longer or shorter than the light pulse. That means that the sensor is linked to the switching, but it does not necessarily need to capture radiance data during the time period only one illuminant is active. This procedure could be advantageous in some systems to reduce noise, or due to sensor timing limitations.

It is possible that the sensor is synchronized to the light source and that the sensor tracks the illuminants' status during the sensor integration time. The spectral changes of the light source are managed by a control unit via a network, working in sync with the sensor's integration times. Multiple light sources connected to the network can be synced to have the same temporal and spectral change frequencies amplifying the effect.

In another aspect, embodiments of the invention are directed to a method for object recognition via a computer vision application. The proposed method comprises at least the following method steps:

providing an object with object specific reflectance and fluorescence spectral patterns, the object is to be recognized, illuminating a scene including the object with a light source which is composed of at least two illuminants by switching between the at least two illuminants, wherein at least one of the at least two illuminants is based on at least one solid-state system, measuring, by means of a sensor, radiance data of the scene including the object to be recognized when the scene is illuminated by the light source, providing a data storage unit such as a database with fluorescence spectral patterns linked with appropriately assigned respective objects, estimating, by a data processing unit, the object-specific fluorescence spectral pattern of the object to be recognized out of the radiance data of the scene, and comparing/matching, by the data processing unit, the estimated object-specific fluorescence spectral pattern of the object to be recognized with the fluorescence spectral patterns stored in the data storage unit, and identifying, by the data processing unit, a best matching fluorescence spectral pattern and, thus, the object assigned to the best matching fluorescence spectral pattern.

The step of providing an object with an object specific reflectance and fluorescence spectral pattern comprises, according to a possible embodiment, in the case of an artificial object, for example, imparting fluorescence to the object to be recognized with a fluorescence material.

In the case of a natural object as the object to be recognized, it is possible that the object intrinsically already has object specific reflectance and fluorescence spectral patterns.

The step of imparting fluorescence to the object may be realized by coating the object with the fluorescence material or otherwise imparting fluorescence to the surface of the object. In the latter case fluorescence may be distributed throughout the whole object, and may thus be detectable at the surface as well.

According to a possible embodiment of the proposed method, the method further comprises the step of displaying via a display device at least the identified object which is assigned to the identified best matching fluorescence spectral pattern.

The matching step of the proposed method particularly comprises to identify the best matching fluorescence spectral pattern by using any number of matching algorithms between the estimated object-specific fluorescence spectral pattern and the stored fluorescence spectral patterns, the matching algorithms being chosen from the group comprising but not limited to lowest root mean squared error, lowest mean absolute error, highest coefficient of determination, matching of maximum wavelength value. Generally, the matching algorithms are arbitrary.

The estimating step of the proposed method particularly comprises to estimate, using the measured radiance data under the at least two illuminants, the fluorescent spectra and the reflective spectra of the object.

The step of providing the data storage unit comprises to form a database of fluorescence chemistry information of objects, i.e. of fluorescence spectral patterns of objects/articles by designing multiple fluorescent formulations, each fluorescent formulation being applied and, thus, assigned to an object such that the object obtains and displays an object-specific fluorescence spectral pattern when being illuminated by the light source. This can be achieved by using specific mixtures of fluorescent chemicals with different emission profiles in specific ratios to achieve different unique spectral signatures/fluorescence spectral patterns.

Particularly, the light source is chosen as a switchable light source with two illuminants and with a short switchover time between the two illuminants, i.e. the two illuminants change rapidly among one another. It is further possible that the two illuminants are two sinusoidal-like illuminants of opposite phases. The two illuminants can be chosen as LED illuminants.

The step of capturing the radiance data of the scene is particularly performed by a sensor which is linked and synchronized to the switching of the light source between the at least two illuminants. It is possible to only capture information during the time period one illuminant is active. Alternatively, it is also possible to capture information during the time period one or more illuminants are active and to use various algorithms to calculate the radiance for a subset of the illuminants.

In another aspect, embodiments of the invention provide a computer program product having instructions that are executable by a computer, the computer program product comprising instructions to realize/perform/execute any one of the embodiments of the proposed method.

The present invention refers to a system and a method where fluorescence spectra of an object to be recognized are characterized under controlled and temporal lighting conditions and at spectral bands/lines of interest while the spectral signature of the fluorescent formulation, which is applied to the object to be recognized, is used for object recognition in computer vision applications. The proposed system and method enable recognition of an object irrespective of its shape, ambient lighting, and partial occlusions by using fluorescence chemistry, i.e. the fluorescence spectral pattern, of the object to be recognized as a tag.

In order to provide the data storage unit of the proposed system, unique fluorescence spectral patterns measured for specific objects/articles and accordingly linked with those objects are used in order to form a database of fluorescence chemistry information of specific objects. The fluorescence is either applied as an additive, coating, paint etc. or it is part of the biological material (i.e. fruit, vegetable) or it naturally exists (not artificially placed) but can be detected. The data storage unit provides a tool of unique fluorescence spectral patterns, each being linked uniquely with a specific object. By means of the data storage unit the proposed system is enabled to recognize objects displaying a specific fluorescence chemistry using the proposed system by first illuminating a respective object by the light source, sensing by the sensor radiance data of the object and estimating by the data processing unit the object-specific fluorescence spectral pattern out of the radiance data and comparing the estimated object-specific fluorescence spectral pattern with the fluorescent spectral patterns stored in the data storage unit.

It is known in the art that having engineered features that can be easily defined and detected is the most computationally efficient way of identifying objects visually in comparison to other techniques. For example, by the scanning of a barcode, a system immediately connects to a database to identify the object being scanned. Similarly, the proposed system is even more efficient due to its ability to identify discrete fluorescence spectral patterns in the spectral dimension of an image like a barcode reader operates in the spatial dimension. The number of spectral characters is independent of the shape of the object of interest. This enables the proposed system and method to not be limited in number of classifications to geometry/shape of objects. Objects with the same shape and even same color can be distinguished by analyzing the fluorescence chemistry extracted by the computer vision system.

One of the key aspects of the invention is that ambient lighting elements can be utilized as light probes for the proposed system and method. Indoor conditions usually require a controlled and uniform lighting environment to be present to facilitate computer vision applications. However, the proposed system and method capitalize on the differences of lighting conditions to recognize objects instead. Furthermore, one unique aspect of the system is that it utilizes a rapid change of ambient lighting from a LED light source or comparable arrangements to extract fluorescence chemistry information from a respective object. The rapid changing of such lighting conditions is not visible to human eyes and the spectral changes of lighting sources can be managed by the system through a network, working in sync with the sensor's integration times. Multiple light sources connected to the network can be synced to have the same temporal and spectral change frequencies amplifying the effect.

Another unique aspect of the invention is that the fluorescence (or chemistry) information of the objects can be coupled to information about that object, i.e. type of material, price, manuals, etc. and information held at the dynamic (live) database, i.e. the data storage unit that tracks and updates the information in 3D maps. By dynamically tracking the objects in 3D space using the proposed system and potentially in combination with other methods, the proposed system would enable the ability to distinguish two identical objects by 3D location of those objects for as long as the object locations are dynamically updated, and the objects are in field of view of the sensor of the proposed system.

The above-mentioned examples highlighting the unique utility of the proposed system are not complete and it is not intended to be limited to those specific applications. Further applications can be based on platforms using cameras of various types, including monochrome, RGB type, multispectral or hyperspectral sensors of light.

According to one embodiment of the proposed method the object to be recognized is provided with a luminescence material which is chosen from the group comprising at least:

Any material with fluorescence (Stokes) characteristics in the UV, VIS, NIR and/or IR, any material with upconversion (anti-Stokes) characteristics in VIS and/or NIR, biologicals designed with fluorescence effects, biologicals designed with natural fluorescence effects, and/or food colorants.

The technique for imparting the object to be recognized with a luminescence material can be chosen as one or a combination of the following techniques: spraying, rolling, drawing down, deposition (PVC, CVD, etc.), extrusion, film application/adhesion, glass formation, molding techniques, printing such as inks, all types of gravure, inkjet, additive manufacturing, fabric/textile treatments (dye or printing processes), dye/pigment absorption, drawings (hand/other), imparting stickers, imparting labels, imparting tags, chemical surface grafting, dry imparting, wet imparting, providing mixtures into solids, providing reactive/nonreactive dyes.

The sensor to measure the radiance data of the scene can be chosen of the group comprising at least: photodiodes of all types, sensors covering wavelengths from 250 nm and above, sensors covering wavelengths up to 1.800 nm, sensors having dynamic or static filters, prism based or comparable spatially wavelength separated systems, multiple cameras, stereocameras, hyperspectral sensors 10 bands), multispectral sensors (>3 bands), RGB sensors (3 bands), sensors covering all bands or only selected bands, sensors covering all frame rates, other sensors responsive to photons and/or electromagnetic radiation (250 nm to 1.800 nm), sensors comprising polarized filters (circular, linear, etc.), sensors having nonpolarized filters.

The database can be stored on an edge computing system or it can be stored on a cloud. The data can be stored with or without additional information concerning the respective objects attached, ads, price, owner, SDS, calorie values, recipes. Further data can be provided with expiration date, date of manufacture, name, shelf life, ingredients list, location, time stamp of the respective objects. Further the data can be provided with use instructions, manufacturer, place of origin, recycling directions, manuals, ratings, reviews concerning the respective objects. Further the data can be provided with information about traffic signage information, data about type of material such as textile, clothing, dog leash, bicycle, car etc. concerning the respective objects. Further, it can be provided with data about usage levels, remaining amounts, weight, volume, alcohol content, alcohol consumed of the respective objects.

The identified object which is assigned to the best matching luminescence spectral pattern can be displayed via one or a combination of the following devices: smart glasses, smart phones, smart watches, other wearables such as chest cameras, spy cams, shoes, shirts, buttons, contact lenses, security cameras, vehicles, drones, robotics, home assistants, laptops, tablets, traffic monitor cameras, indoor and outdoor systems, mobile or stationary systems, TVs, toys, portable scanners, stationary scanners, coffee machines, home appliances, industrial machinery, production equipment/plants, recycling/sorting equipment, smart trash bins, smart recycling bins, pens.

The proposed method has many application areas. Thus, it can be used for example in: object recognition, object tracking, classification of objects, object identification, object locating, inventory management, automated orders, retail, online store, accident prevention autonomous vehicles, anti-counterfeiting, augmented reality or mixed reality applications, advertising, fitness/health management, warehousing, manufacturing, assembly, counting, learning, sports, instructions, manuals, advice, cooking, and artificial intelligence support.

The invention is further defined in the following examples. It should be understood that these examples, by indicating preferred embodiments of the invention, are given by way of illustration only. From the above discussion and the examples, one skilled in the art can ascertain the essential characteristics of this invention and without departing from the spirit and scope thereof, can make various changes and modifications of the invention to adapt it to various uses and conditions.

BRIEF DESCRIPTION OF THE DRAWINGS

FIGS. 5A-5C show in different tables different comparing/matching algorithms for example 1.

FIGS. 9A-9C show in different tables different comparing/matching algorithms which can be used for example 2.

DETAILED DESCRIPTION

Figure 1:
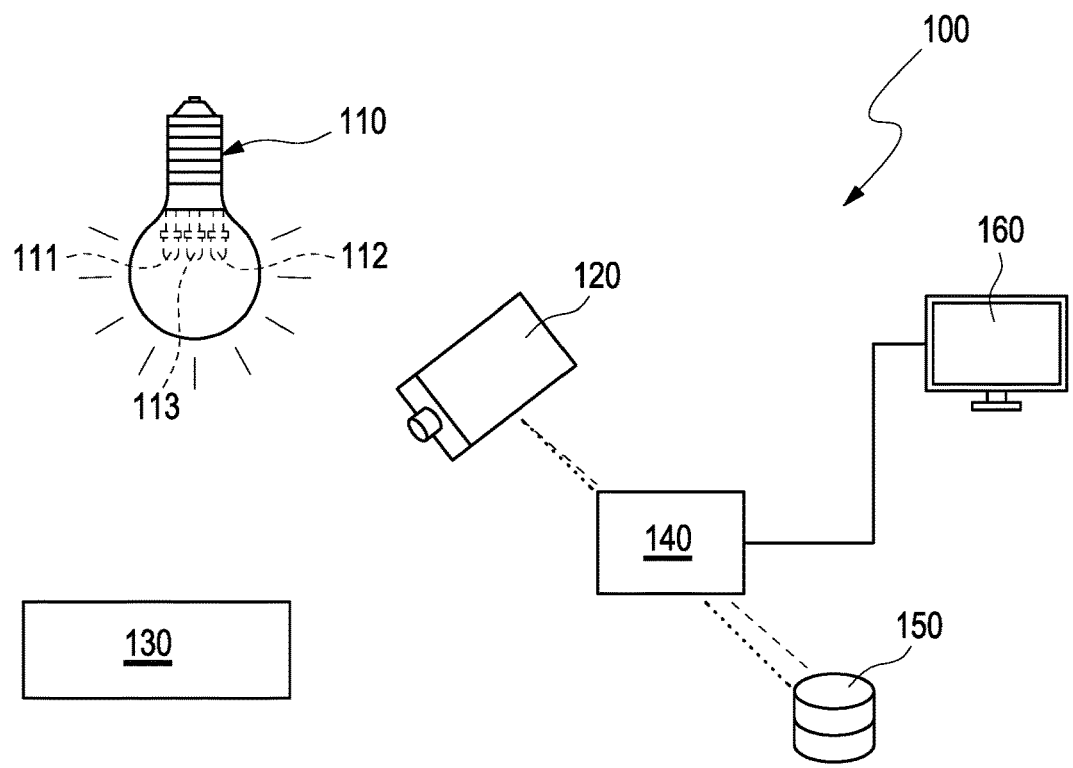
FIGS. 1A and 1B show schematically embodiments of the proposed system.
Figure 1:
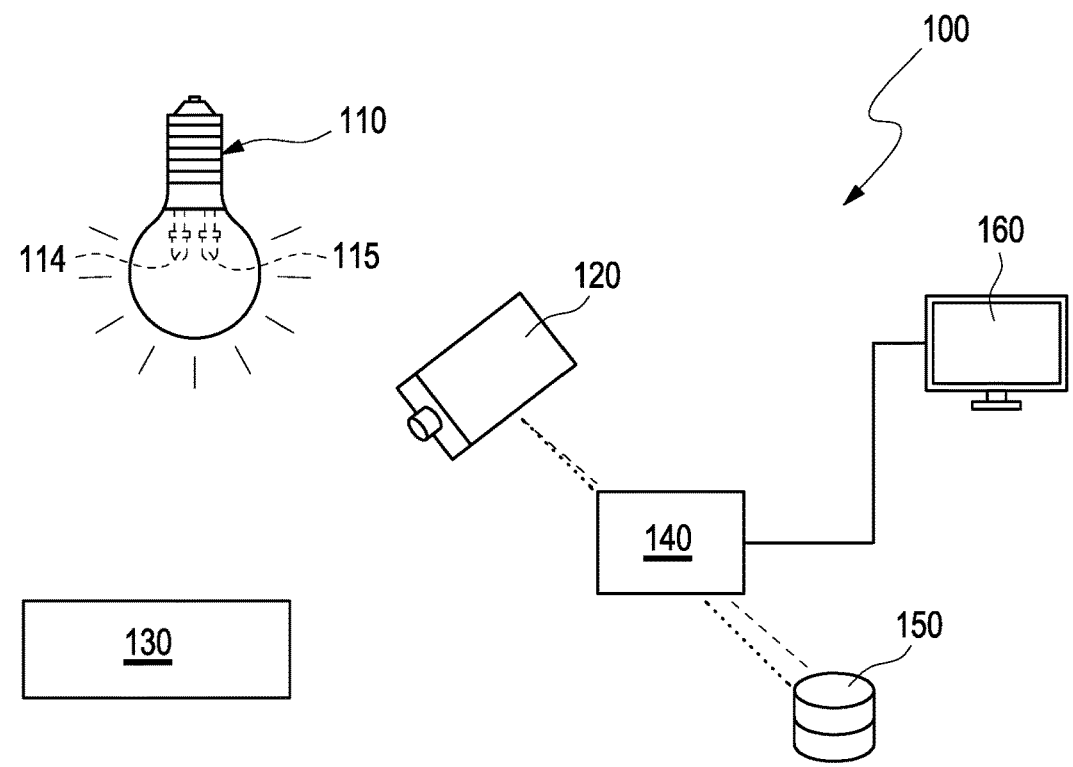

FIG. 1A and FIG. 1B show schematically embodiments of the proposed system 100. The system 100 includes at least one object 130 to be recognized. Further the system 100 includes a sensor 120 which can be realized by an imager, such as a camera, particularly a multispectral or a hyperspectral camera. The system 100 further includes a light source 110. The light source 110 is composed of different individual illuminants, the number of which and nature thereof depend on the method used. For example 1 as indicated in FIG. 1A, three illuminants are provided and the three illuminants are commonly available incandescent 111, compact fluorescent 112, and white light LED 113 bulbs. The light source may also be composed of two illuminants as shown in FIG. 1B. For example 2, only two illuminants are provided, the two illuminants are custom LED illuminants 114 and 115. Illuminant 114 consists of three LEDs operating at 5 V. One LED is a 400 nm LED from VCC (VAOL-5GUV0T4), with an inline resistor of 3300 ohms. The second LED is a 500 nm LED from Lumex® (SSL-LX5093UEGC), with an inline resistor of 3300 ohms. The third LED is a 610 nm LED from Lumex® (SSL-LX5094SOC), with an inline resistor of 680 ohms. Illuminant 115 consists of three LEDs operating at 5V. One LED is a 470 nm LED from Cree, Inc. (C503B-BCS-CV0Z0461), with an inline resistor of 5000 ohms. The second LED is a 574 nm LED from Kingbright® (WP7113CGCK), with an inline resistor of 100 ohms. The third LED is a 643 nm LED from VCC (VAOL-5GAE4), with an inline resistor of 47 ohms.

The light source may be configured to illuminate a scene including the object 130 to be recognized by rapidly switching between the different illuminants (111, 112 and 113 in FIG. 1A, or 114 and 115 in FIG. 1B). The system 100 further comprises a data processing unit, i.e. CPU 140 which is configured to estimate an object specific reflectance and/or fluorescence spectral pattern with reflectance and/or fluorescence spectral patterns stored in a data storage unit 150 which is wirelessly or over a wire connected with the CPU 140 and to identify a best matching reflectance and/or fluorescence spectral pattern and, thus, an object which is assigned to the best matching reflectance and/or fluorescence spectral pattern. The system 100 further includes a display unit 160 which is configured to display at least the identified object which is assigned to the identified best matching fluorescence spectral pattern. The system 100 can comprise more than one sensor, more than one light source and/or more than one object wherein all components of the system form a network. Using the system 100 it is possible to perform an embodiment of the proposed method for object recognition. The object 130 to be recognized is imparted with a fluorescent material, thus providing the object with an object specific reflectance and fluorescence spectral pattern. To create materials with unique fluorescent spectral patterns/signatures, BASF Lumogen® F series dyes dispersed into a one-component automotive clear coat were used. Four different dyes, including Yellow 170, Orange 240, Pink 285, or Red 305, labelled A, B, C, and D, and a combination of Yellow 170 and Orange 240, labelled E, was used to create materials for examples 1 and 2. The tinted clear coats were drawn down onto white steel panels at 200 micron thickness and cured. Other methods of applying fluorescence to an object may be used.

The coated object 130 is illuminated with the light source 110 which is composed of multiple illuminants. The illuminants may be rapidly switched at a rate that is not visible to the human eyes and the illuminant changes managed by the proposed system through the network, working in sync with the integration times of the sensor 120. Generally, it is possible that multiple light sources connected to the network can be synced to have the same temporal and spectral change frequencies amplifying the effect. When the scene including the object 130 is illuminated by the light source 110 radiance data of the scene including the object 130 are captured/measured by the sensor 120. The data processing unit 140 estimates the object specific reflectance and/or fluorescence spectral pattern out of the radiance data of the scene by first separating fluorescence and reflectance spectra of the object.

Multiple methods of separating fluorescence from reflectance are known. The method used in example 1 is described in Yinqiang Zheng, Imari Sato, and Yoichi Sato, "Spectra Estimation of Fluorescent and Reflective Scenes by Using Ordinary Illuminates", ECCV 2014, Part V, LNCS 8693, pp. 188-202, 2014. The method described therein images a fluorescent material under three different broadband illuminants with a hyperspectral camera. This paper in incorporated by reference in full.

According to the present invention, using the measured radiance data under three different illuminants 111, 112, and 113 as shown in FIG. 1A, the reflectance and fluorescence spectral patterns are calculated in a multistep optimization process. The calculated fluorescence spectral pattern for the object 130 is compared by the processing unit 140 to the known and measured (using a fluorometer) spectral pattern from a library of materials stored in the database 150. The database 150 includes multiple fluorescence spectral patterns linked with specific objects, respectively. To form such a database it is possible to design different fluorescent formulations and applying those fluorescent formulations on respective different objects so that each object is uniquely linked with an object specific fluorescence spectral pattern. The fluorescent formulations can be designed by using specific mixtures of fluorescent chemicals with different emission profiles, in specific ratios to achieve unique spectral signatures, respectively. The fluorescent material applied to the object 130 can then be identified by any number of matching algorithms between the calculated object specific fluorescence spectral pattern and the known material spectral patterns stored in the database 150, for example, by lowest root mean squared error, lowest mean absolute error, highest coefficient of determination, or matching of maximum emission wavelength value. Identification of the fluorescent material then allows for the identification of object 130 using the database information.

Finally, the data processing unit 140 matches the estimated fluorescence spectral pattern with object-specific fluorescence spectral patterns stored in the data storage unit 150 and identifies the best matching fluorescence spectral pattern. Finally, the data processing unit 140 can read out from the data storage unit 150 by means of the identified best matching fluorescence spectral pattern the object which is linked to this best matching fluorescence spectral pattern and can display the object together with the fluorescence spectral pattern on the display unit 160.

The imager 120 can be a hyperspectral camera or a multispectral sensor. Instead of the two dozen or more individual sensor bands in a hyperspectral sensor, a multispectral sensor has approximately 4 to 20 sensor bands. Multispectral sensors can operate in snapshot mode, capturing an entire scene during a single exposure. In contrast, hyperspectral sensors typically operate in line scanning mode, meaning they cannot image the entire scene at one time. Additionally, multispectral sensors are much more economical than hyperspectral cameras. Multispectral sensors do not have the same spectral resolution as hyperspectral cameras, but they are sufficient to predict the material identification using the proposed method with appropriate matching algorithms. The sensor may also operate in a monochrome manner, with a mechanism to change the spectral region measured through time. The sensor may operate with narrow-band filters. This may be useful in outdoor conditions or other conditions with a solar lighting component when the narrow-band filters correspond to Fraunhofer lines, which are wavelengths missing from the solar spectrum due to elemental absorption within the sun. In this manner, the solar radiation, which may be overpowering compared to the artificial light source, can largely be excluded, allowing for the separation of reflectance and fluorescence and therefore object identification.

The fluorescent object 130 was imaged under the different illuminants, 111, 112, and 113 for example 1 as indicated in FIG. 1A, or the LED illuminants 114 and 115 for example 2 as indicated in FIG. 1B. The sensor 120 used is a Resonon Pika L hyperspectral imager for examples 1 and 2, consisting of 300 wavelength bands between approximately 384 nm and 1024 nm and positioned roughly 0.5 metres from the object 130. For example 2, the resulting radiances where rebinned to 10 nm intervals between 420 nm and 740 nm.

The method used to separate fluorescence from reflectance used in example 2 is in the paper of Fu et al. "Separating Reflective and Fluorescent Compenents Using High Frequency Illumination in the Spectral Domain", ICCV 2013. As applied in their paper, the method requires customizable light source (Nikon ELS-VIS) capable of outputting a sinusoidal-like spectrum. The customizable light source is low powered and expensive, preventing widespread use or use in typically sized scenes. Surprisingly, it has been found here that the light source can be replaced with inexpensive and high-powered LEDs despite current LED technology being unable to create as narrow of emission bands as the Nikon ELS-VIS. The hyperspectral images were recorded in the same manner as Example 1 and rebinned to 10 nm intervals. Wavelengths at which both LED illuminants 114, 115 have similar radiances are omitted due to the nature of the calculation. The calculated/estimated emission results were compared with the fluorescence emission measured for each material using a fluorescence spectrophotometer. To facilitate easy comparison, the measured emission spectrum was also rebinned to the same 10 nm intervals and the same wavelengths omitted.

For achieving the calculated/estimated emission results, a simple algorithm is applied to the measured radiance data at each wavelength under each illuminant of the two LED illuminants 114, 115 and thus allows for separation of the reflectance and fluorescence emission spectra to be captured.

Since reflection and fluorescence have different physical behaviours, they need to be described by different models. The radiance of a reflected surface depends on the incident light and its reflectance. Using the nomenclature of the above mentioned paper Fu et al., the observed radiance of an ordinary reflected surface at a wavelength $\lambda$ is computed as $$p_r(\lambda) = l(\lambda) \cdot r(\lambda) \tag{1}$$

where $l(\lambda)$ is the spectrum of the incident light at wavelength $\lambda$ and $r(\lambda)$ is the spectral reflectance of the surface at wavelength $\lambda$.

The observed radiance of a pure fluorescent surface depends on the incident light, the material's absorption spectrum, and its emission spectrum. Fluorescence typically absorbs light at some wavelengths and emits them at longer wavelengths. The surface's absorption spectrum will determine how much of the light is absorbed. Some of the absorbed energy is then released in the form of an emission spectrum at longer wavelengths than the incident light. The remainder of the absorbed energy is released as heat. The observed spectrum of pure fluorescent surface at wavelength $\lambda$ is described in terms of its absorption and emission spectra as $$p_f(\int l(\lambda')a(\lambda')d\lambda')e(\lambda) \tag{2}$$

where $a(\lambda')$ and $e(\lambda)$ represent the absorption and emission spectrum. With $k=\int l(\lambda')a(\lambda')d\lambda'$, $p_f(\lambda)$ can be written as $p_f(\lambda)=ke(\lambda)$ which means that the shape or the distribution of the emitted spectrum is constant but the scale k of the emitted spectrum changes under different illuminations. Namely, the radiance of the fluorescent emission changes under different illuminations, but its colour stays the same regardless of illumination colour. Finally, the reflective and fluorescent surface shows a radiance according to:

$$p(\lambda) = l(\lambda) \cdot r(\lambda) + ke(\lambda) \tag{3}$$

When using, as proposed according to the proposed method, high frequency sinusoidal illuminance in the spectral domain, the radiance of the object under these two sinusoidal illuminants can be described as:

$$p_1(\lambda) = l_1(\lambda)r(\lambda) + ke(\lambda)$$

$$p_2(\lambda) = l_2(\lambda)r(\lambda) + ke(\lambda) \tag{4}$$

Therefrom, the reflectance $r(\lambda)$ and the fluorescent emission $ke(\lambda)$ can be recovered as $$r(\lambda) = \frac{p_1(\lambda) - p_2(\lambda)}{l_1(\lambda) - l_2(\lambda)} \tag{5}$$

$$ke(\lambda) = p_1(\lambda) - \frac{p_1(\lambda) - p_2(\lambda)}{l_1(\lambda) - l_2(\lambda)} l_1(\lambda) \tag{6}$$

By means of the above described equations it is possible to calculate from the radiance data $p(\lambda)$ and the intensity $I(\lambda)$ from the illuminants the reflectance $r(\lambda)$ and the fluorescent emission $e(\lambda)$ of the object which has been illuminated by the light source. Thereby, the fluorescent emission corresponds to the object specific fluorescence spectral pattern of the object. The calculated object specific fluorescence spectral pattern is then compared with the fluorescence spectral patterns which are stored in the database and linked with respective specific objects.

Figure 2:
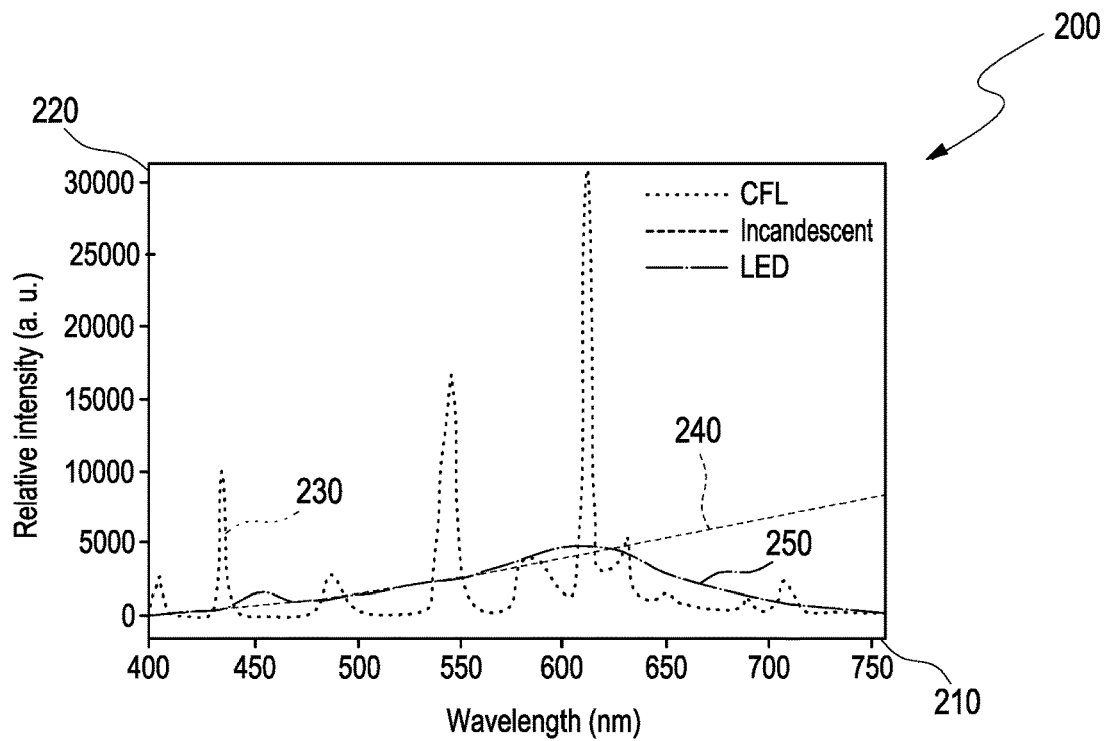
FIG. 2 shows measured radiances of three broadband light sources used in example 1.

FIG. 2 shows example illuminant spectra 230, 240, and 250. The diagram 200 shows a horizontal axis 210 along which the wavelength is plotted and a vertical axis 220 shows the intensity of the illumination. The curve 230 shows the illumination of a first illuminant, namely a CFL (Compact Fluorescent Lamp) with at least three pronounced maxima, namely at 435.15 nm, at 546.47 nm and the highest maximum at 611.45 nm. The curve 240 shows the illuminant spectrum of a second illuminant, namely an incandescent illuminant with a light increase in intensity with increasing wavelength. The curve 250 shows the illuminant spectrum of a third illuminant, namely a LED with two pronounced maxima, namely at 453.54 nm and at 603.02 nm.

Figure 3:
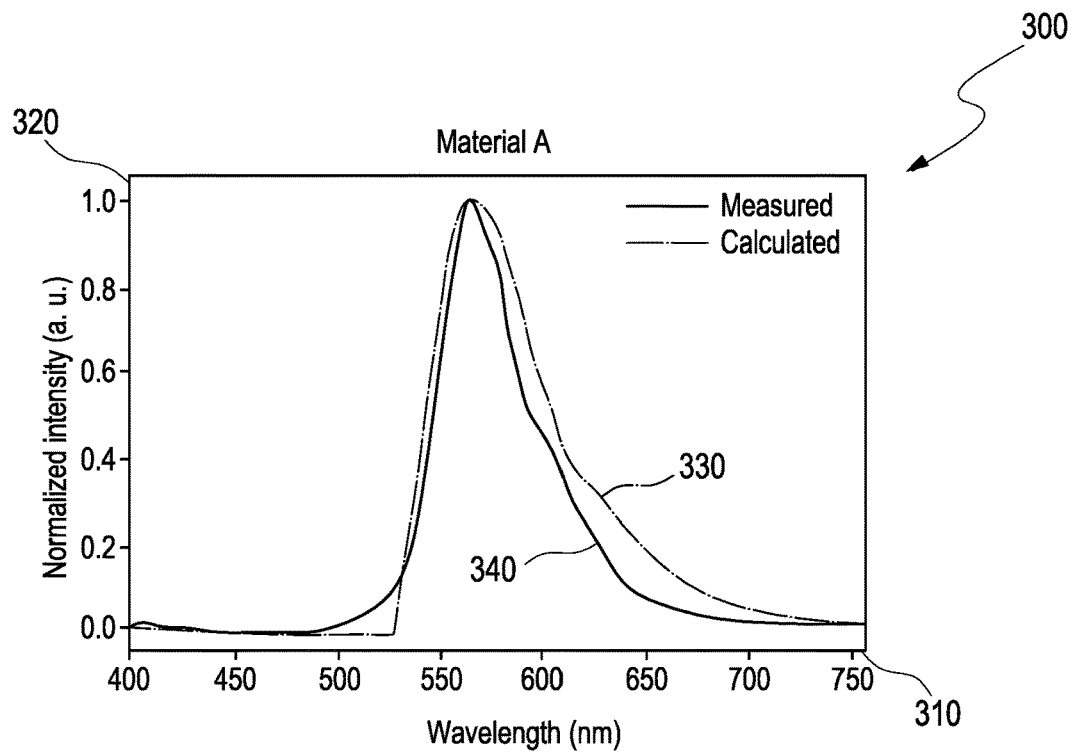
FIG. 3 shows an example comparison of measured and calculated emission spectral patterns for one material from example 1.

FIG. 3 shows a comparison of calculated emission results (calculated fluorescence spectral patterns) for example 1 with fluorescent emissions measured for material A using a fluorometer. The diagram 300 is spanned over a horizontal axis 310 showing the wavelength and a vertical axis 320 showing the normalized emission intensity. As can be seen from the curves 330 and 340 wherein the curve 330 shows the calculated emission with a maximum at 565.26 nm and the curve 340 shows the measured emission with a maximum at 568 nm, a good accordance is visible.

Figures 4, 5:
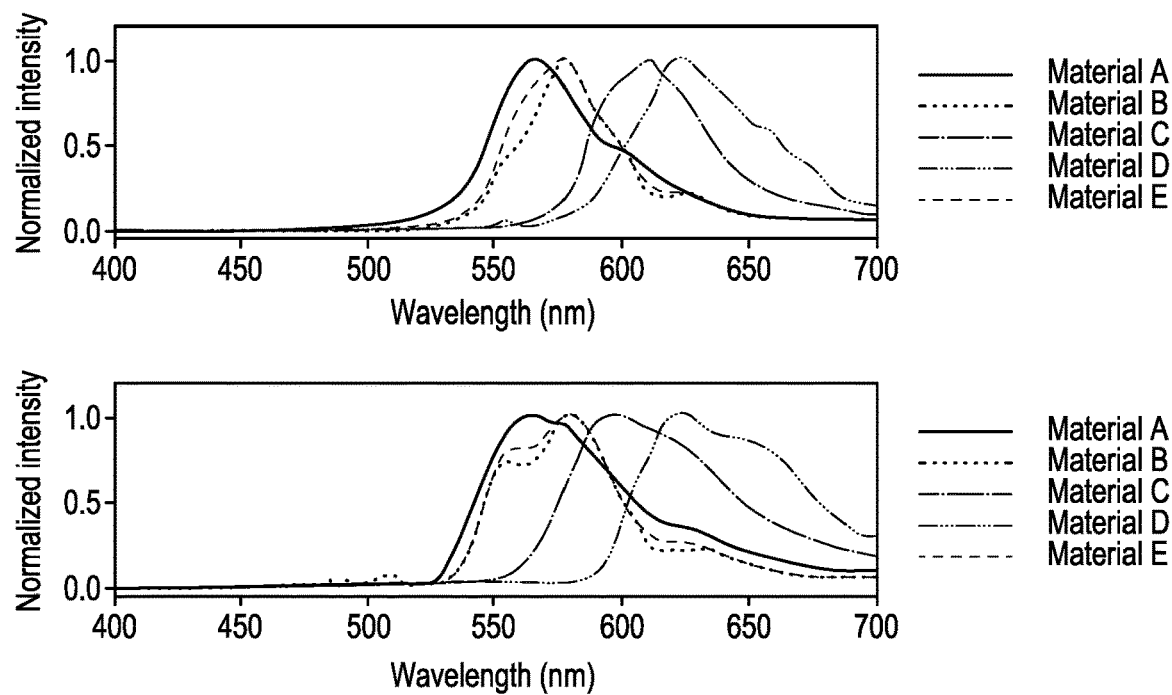
FIG. 4 shows measured (top) and calculated (bottom) emission spectra (spectral patterns) for all materials for example 1.

FIG. 4 shows on the top portion measured emission spectra (measured fluorescence spectral patterns) and on the bottom portion respective calculated emission spectra (calculated fluorescence spectral patterns) for different materials A, B, C, D, E, for example 1. In each diagram for each different material A, B, C, D, E a different curve is plotted as indicated.

FIGS. 5A-5C show the results of quantitative comparisons between the calculated and measured fluorescence emission spectra for example 1. The mean absolute error (FIG. 5A), spectral angle (FIG. 5B) and Euclidean distance (FIG. 5C) were calculated for every calculated spectrum in relation to the spectra for each measured material. The mean absolute error is a common method of comparing the error of a calculated value to the ground truth value, lower mean absolute error values indicate a better match between the calculated and ground truth values. Spectral angle mapping (FIG. 5B) is a concept used in spectral imaging to classify objects to a known database of spectra. For spectral angle mapping, a lower value is indicative of a closer match between the unknown object and the measured object. Euclidean distance (FIG. 5C) is another concept used in spectral imaging in the same manner as spectral angle. Again, lower values indicate a better match for Euclidean distance. For the materials A, C, D and E the mean absolute error, spectral angle, and Euclidean distance calculation results correctly identify the unknown material, with the exception of material B, as can be seen from the tables shown in FIG. 5A, FIG. 5B and FIG. 5C, respectively.

Figure 6:
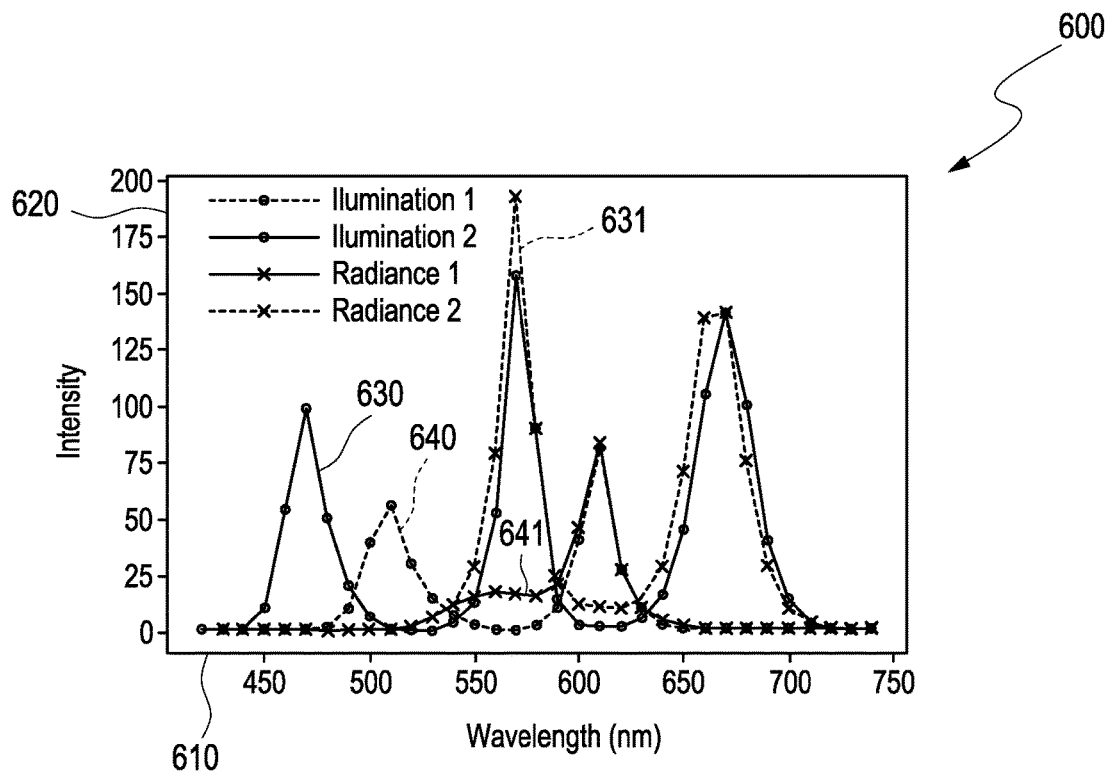
FIG. 6 shows a diagram of example illuminant spectrums and measured radiances under a LED light source used in an embodiment of the proposed system.

FIG. 6 shows example illuminant spectrums and measured radiances under each illuminant for example 2. The diagram 600 shows a horizontal axis 610 along which the wavelength is plotted and a vertical axis 620 that shows the intensity of the illumination. The curve 640 shows the illumination of a first illuminant and the curve 641 shows the respective radiance data of the object illuminated by the first illuminant. The curve 630 shows the illuminant spectrum of a second illuminant and the curve 631 shows the respective radiance data of the object when illuminated by the second illuminant. The effect of fluorescence emission is obvious in the range from ≈530-650 nm.

Figure 7:
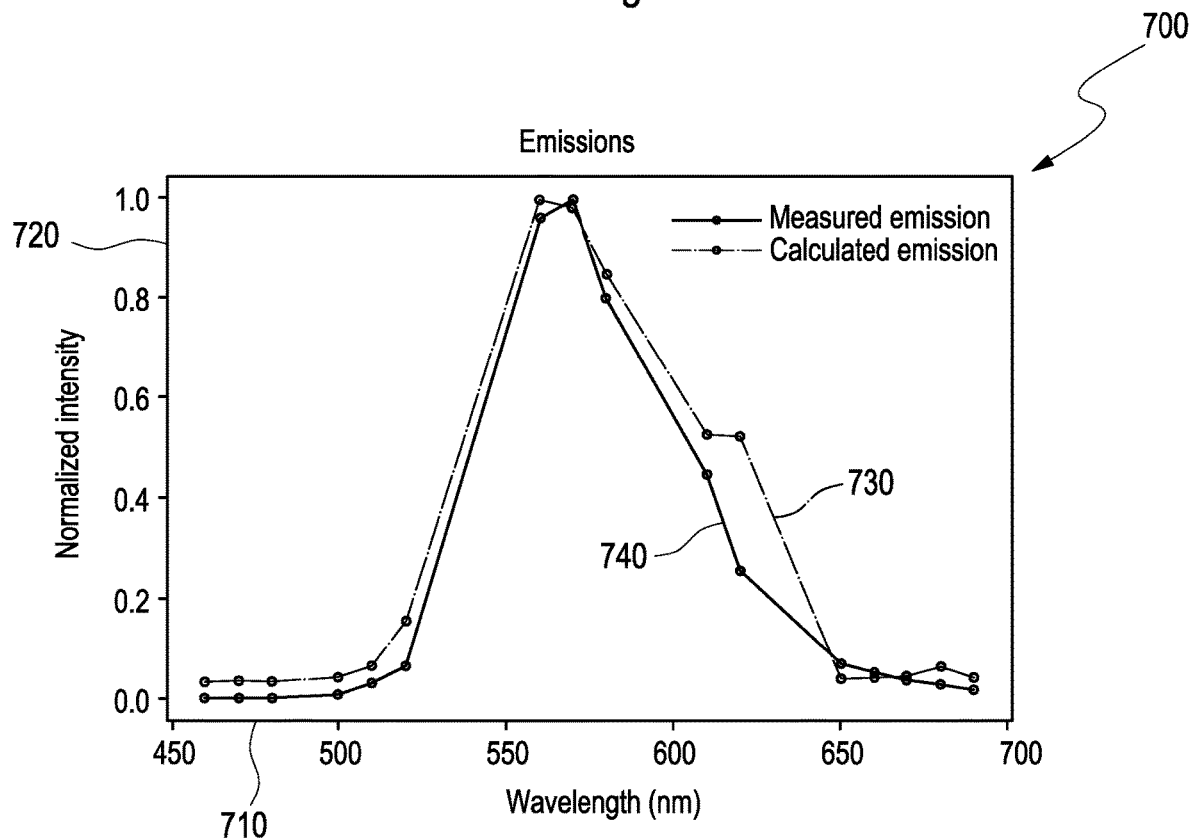
FIG. 7 shows a diagram of an example comparison of measured and calculated emission spectra (spectral patterns).

FIG. 7 shows a comparison of calculated emission results (calculated fluorescence spectral patterns) for example 2 with fluorescence emissions measured for material A using a fluorometer. The diagram 700 is spanned over a horizontal axis 710 showing the wavelength and a vertical axis 720 showing the normalized emission intensity. As can be seen from the curves 730 and 740 wherein the curve 730 shows the calculated emission and the curve 740 shows the measured emission, a good accordance is visible.

Figure 8:
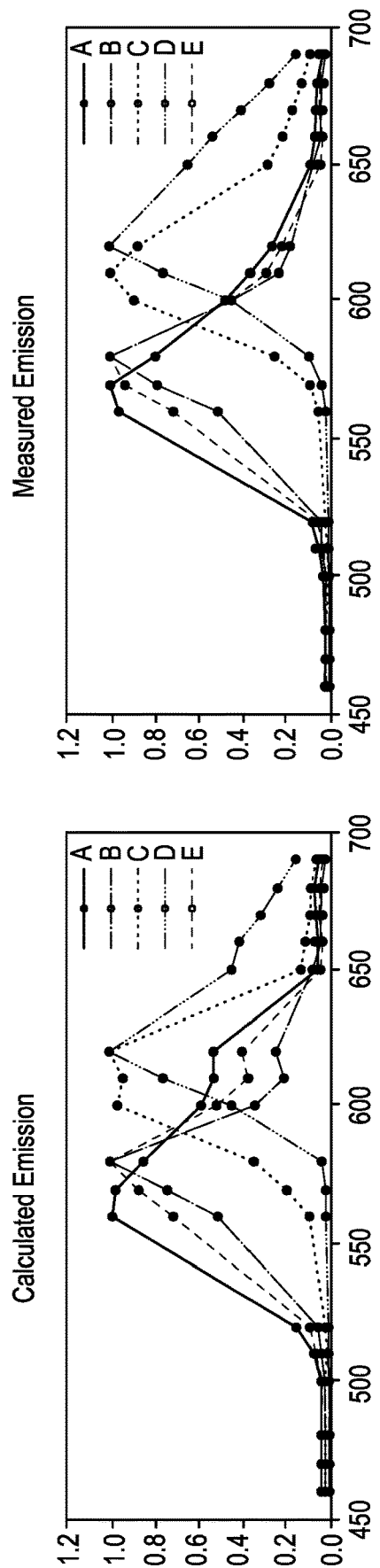
FIG. 8 shows calculated emission spectra (spectral patterns) (left) and measured emission spectra (spectral patterns) (right).

FIG. 8 shows on the left side calculated emission spectra (calculated fluorescence spectral patterns) for example 2 and on the right side respective measured emission spectra for different materials A, B, C, D, E. In each diagram for each different material A, B, C, D, E a different curve is plotted as indicated.

FIGS. 9A-9C show the results of quantitative comparisons between the calculated and measured fluorescence emission spectrum for example 2. The mean absolute error (FIG. 9A), spectral angle (FIG. 9B) and Euclidean distance (FIG. 9C) were calculated for every calculated spectrum in relation to the spectra for each measured material. For each of the materials A, B, C, D and E the mean absolute error, spectral angle, and Euclidean distance calculation results correctly identify the unknown material as can be seen from the tables shown in FIG. 9A, FIG. 9B and FIG. 9C.

The invention claimed is:

1. A system for object recognition via a computer vision application, the system comprising at least the following components:
    an object to be recognized, the object having an object specific reflectance and an object specific fluorescence spectral pattern,
    a light source which is composed of at least two illuminants and is configured to illuminate a scene including the object to be recognized by switching between the at least two illuminants, wherein at least one of the at least two illuminants comprises at least one solid-state lighting system having a wavelength of at least 450 nm, wherein the at least one solid-state lighting system is selected from the group consisting of semiconductor light-emitting diodes (LEDs), organic light-emitting diodes (OLEDs), or polymer light-emitting diodes (PLEDs),
    a sensor which is configured to measure radiance data of the scene including the object when the scene is illuminated by the light source,
    a data storage unit which comprises fluorescence spectral patterns each being linked uniquely with a specific object,
    a data processing unit which is configured to extract the object specific fluorescence spectral pattern of the object to be recognized out of the radiance data of the scene and to match the extracted object specific fluorescence spectral pattern with the fluorescence spectral patterns stored in the data storage unit, and to identify a matching fluorescence spectral pattern and, thus, its assigned object.

2. The system according to claim 1, further comprising a display unit which is configured to display at least the identified object which is assigned to the identified matching fluorescence spectral pattern.

3. The system according to claim 1, wherein the object to be recognized is imparted with a predefined fluorescence material and the resulting object's fluorescence spectral pattern is known and used as a tag.

4. The system according to claim 1, wherein the data processing unit is configured to identify the matching fluorescence spectral pattern by using any number of matching algorithms between the extracted object specific fluorescence spectral pattern and the stored fluorescence spectral patterns, the matching algorithms being chosen from the group comprising at least: lowest root mean squared error, lowest mean absolute error, highest coefficient of determination, matching of maximum wavelength value.

5. The system according to claim 1, wherein the processing unit is configured to estimate, using the measured radiance data under the at least two illuminants, the fluorescence spectral pattern and a reflective spectral pattern of the object to be recognized.

6. The system according to claim 1, wherein the sensor is a hyperspectral camera or a multispectral camera.

7. The system according to claim 1, wherein the sensor has one or more narrow bandpasses that correspond to Fraunhofer lines.

8. The system according claim 1, wherein the light source is a switchable light source wherein the light source is configured to rapidly switch between the two illuminants.

9. The system according to claim 1, wherein the sensor is synchronized to the switching of the light source to only measure at one time the radiance data from the scene under one of the at least two illuminants.

10. The system according to claim 1 wherein the sensor is synchronized to the light source and that the sensor tracks the illuminants' status during the sensor integration time.

11. The system according to claim 1 wherein the fluorescence spectral patterns of the objects which are stored in the data storage unit are coupled to information about the respective objects, wherein the information comprises at least one of a type of material, a price, and a manual, and wherein the data storage unit is configured to track and update the information in 3D maps.

12. A method for object recognition via a computer vision application, the method comprising at least the following steps:
   providing an object with an object specific reflectance and an object specific fluorescence spectral pattern, the object is to be recognized
   illuminating a scene including the object with a light source which is composed of at least two illuminants, by switching between the at least two illuminants, wherein at least one of the at least two illuminants comprises at least one solid-state lighting system having a wavelength of at least 450 nm, wherein the at least one solid-state lighting system is selected from the group consisting of semiconductor light-emitting diodes (LEDs), organic light-emitting diodes (OLEDs), or polymer light-emitting diodes (PLEDs),
   measuring, by means of a sensor, radiance data of the scene including the object when the scene is illuminated by the light source,
   providing a data storage unit with fluorescence spectral patterns each being linked uniquely with a specific object,
   estimating, by a data processing unit, the object specific fluorescence spectral pattern of the object to be recognized out of the radiance data of the scene, and
   matching, by the data processing unit, the estimated object specific fluorescence spectral pattern with fluorescence spectral patterns stored in the data storage unit, and
   identifying, by the data processing unit, a matching fluorescence spectral pattern and, thus, its assigned object.

13. The method according to claim 12, wherein the step of providing an object to be recognized comprises imparting the object with a fluorescence material, thus providing the object with an object specific reflectance and an object specific fluorescence spectral pattern.

14. The method according to claim 12, further comprising the following step: displaying via a display device at least the identified object which is assigned to the identified matching fluorescence spectral pattern.

15. The method according to claim 12, wherein the matching step comprises to identify the matching specific fluorescence spectral pattern by using any number of matching algorithms between the estimated object specific fluorescence spectral pattern and the stored fluorescence spectral pattern, the matching algorithms being chosen from the group comprising at least: lowest root mean squared error, lowest mean absolute error, highest coefficient of determination, matching of maximum wavelength value.

16. The method according to claim 12, wherein the estimating step comprises to estimate, using the measured radiance data under the at least two illuminants, the fluorescence spectral pattern and a reflective spectral pattern of the object in a multistep optimization process.

17. The method according to claim 12, wherein the light source is chosen as a switchable light source wherein the light source is configured to rapidly switch between the two illuminants.

18. A computer-implemented process for object recognition via a computer vision application, the process comprising:
   providing an object with an object specific reflectance and an object specific fluorescence spectral pattern, the object is to be recognized
   illuminating a scene including the object with a light source which is composed of at least two illuminants, by switching between the at least two illuminants, wherein at least one of the at least two illuminants comprises at least one solid-state lighting system having a wavelength of at least 450 nm, wherein the at least one solid-state lighting system is selected from the group consisting of semiconductor light-emitting diodes (LEDs), organic light-emitting diodes (OLEDs), or polymer light-emitting diodes (PLEDs),
   measuring, by means of a sensor, radiance data of the scene including the object when the scene is illuminated by the light source,
   providing, by a data storage unit, fluorescence spectral patterns each being linked uniquely with a specific object,
   estimating, by a processing unit, the object specific fluorescence spectral pattern of the object to be recognized out of the radiance data of the scene, and
   matching, by the processing unit, the estimated object specific fluorescence spectral pattern with fluorescence spectral patterns stored in the data storage unit, and
   identifying a matching fluorescence spectral pattern and, thus, its assigned object.

19. The computer-implemented process according to claim 18 further comprising:
   displaying at least the identified object which is assigned to the identified matching fluorescence spectral pattern.

* * * * *